United States Patent
Mears et al.

(10) Patent No.: US 10,161,356 B2
(45) Date of Patent: Dec. 25, 2018

(54) INTEGRATED THRUST REVERSER ACTUATION SYSTEM

(71) Applicant: GE Aviation Systems LLC, Kentwood, MI (US)

(72) Inventors: John S. Mears, Cincinnati, OH (US); George Stephen Billisits, West Chester, OH (US); Chad Russell Wentling, West Chester, OH (US)

(73) Assignee: GE Aviation Systems LLC, Kentwood, MI (US)

( * ) Notice: Subject to any disclaimer, the term of this patent is extended or adjusted under 35 U.S.C. 154(b) by 672 days.

(21) Appl. No.: 14/293,605

(22) Filed: Jun. 2, 2014

(65) Prior Publication Data

US 2016/0186688 A1 Jun. 30, 2016

(51) Int. Cl.
*F02K 1/72* (2006.01)
*F02K 1/56* (2006.01)
(Continued)

(52) U.S. Cl.
CPC .................. *F02K 1/56* (2013.01); *F02C 7/20* (2013.01); *F02K 1/09* (2013.01); *F02K 1/15* (2013.01);
(Continued)

(58) Field of Classification Search
CPC ..... F02K 1/09; F02K 1/15; F02K 1/72; F02K 1/763; F05D 2250/34; F05D 2260/57;
(Continued)

(56) References Cited

U.S. PATENT DOCUMENTS 3,036,431 A * 5/1962 Vdolek .................. F02K 1/625
239/265.31
3,280,562 A * 10/1966 Theits ....................... F02K 1/72
244/52
(Continued)

FOREIGN PATENT DOCUMENTS

| EP | 0852290 A1 | 7/1998 |
| EP | 2305963 A2 | 4/2011 |
| WO | 2011115880 A1 | 9/2011 |

OTHER PUBLICATIONS

EP Search Report dated Oct. 27, 2015 in relation to corresponding EP application 15168753.0.
(Continued)

*Primary Examiner* — Gerald L Sung
*Assistant Examiner* — Marc Amar
(74) *Attorney, Agent, or Firm* — GE Aviation Systems LLC; William Andes

(57) ABSTRACT

A turbofan engine having a turbine engine, a nacelle surrounding a portion of the turbine engine, and a thrust reverser. The thrust reverser comprises a movable control surface movable to and from a reversing position and a thrust reverser actuation system having at least one actuator operably coupled to the movable control surface to move the movable control surface into and out of the reversing position. A guide comprising a rail and a bogie having at least one rotatable bearing surface coupled to the rail for relative translational movement between the rail and bogie connects the turbine engine to the movable control surface such that operation of the at least one actuator moves the movable control surface by translation movement between the rail and the bogie.

11 Claims, 5 Drawing Sheets

(51) Int. Cl.
  *F02K 1/76* (2006.01)
  *F02K 1/15* (2006.01)
  *F02K 1/09* (2006.01)
  *F02C 7/20* (2006.01)

(52) U.S. Cl.
  CPC .......... *F02K 1/72* (2013.01); *F02K 1/763* (2013.01); *F05D 2250/34* (2013.01); *F05D 2260/57* (2013.01); *F05D 2270/60* (2013.01); *F05D 2270/62* (2013.01); *F05D 2270/64* (2013.01); *F05D 2270/66* (2013.01)

(58) Field of Classification Search
  CPC ............ F05D 2270/60; F05D 2270/62; F05D 2270/64; F05D 2270/66
  See application file for complete search history.

(56) References Cited

U.S. PATENT DOCUMENTS

| | | | |
|---|---|---|---|
| 3,503,211 A | 3/1970 | Medawar et al. | |
| 3,511,055 A | 5/1970 | Timms | |
| 3,721,389 A * | 3/1973 | MacKinnon | F02K 1/1207 181/222 |
| 5,136,839 A * | 8/1992 | Armstrong | B64D 29/00 244/55 |
| 5,853,148 A * | 12/1998 | Standish | F02K 1/72 239/265.29 |
| 5,863,014 A * | 1/1999 | Standish | F02K 1/70 239/265.29 |
| 7,484,356 B1 * | 2/2009 | Lair | F02K 1/72 60/226.2 |
| 7,523,604 B2 | 4/2009 | Maguire et al. | |
| 8,632,033 B2 | 1/2014 | Somerfield et al. | |
| 8,720,183 B2 | 5/2014 | Welch et al. | |
| 2003/0024236 A1 * | 2/2003 | Lymons | F02K 1/72 60/226.2 |
| 2004/0159741 A1 * | 8/2004 | Sternberger | F02K 1/72 244/110 B |
| 2009/0126337 A1 | 5/2009 | Hazzard et al. | |
| 2010/0148012 A1 * | 6/2010 | McDonough | B64D 29/00 244/53 B |
| 2011/0067409 A1 | 3/2011 | Beeck | |
| 2011/0120081 A1 * | 5/2011 | Schwark, Jr. | F02K 1/09 60/226.3 |
| 2011/0277448 A1 * | 11/2011 | Roberts | B64D 29/06 60/226.2 |
| 2011/0318173 A1 * | 12/2011 | Ramlaoui | B64D 29/06 415/182.1 |
| 2013/0062433 A1 * | 3/2013 | Vauchel | B64D 29/06 239/265.19 |
| 2013/0062435 A1 | 3/2013 | Moradell-Casellas | |
| 2013/0067884 A1 * | 3/2013 | Bhatt | F02K 1/72 60/204 |
| 2014/0027537 A1 * | 1/2014 | Binks | F02K 1/09 239/265.35 |
| 2014/0030087 A1 | 1/2014 | Soria et al. | |
| 2014/0234090 A1 * | 8/2014 | Hurlin | B64D 29/06 415/182.1 |
| 2015/0125286 A1 * | 5/2015 | Suciu | F01D 25/28 415/201 |
| 2016/0169158 A9 * | 6/2016 | Ramlaoui | F02K 1/763 239/265.19 |

OTHER PUBLICATIONS

European Search Report dated Oct. 27, 2015 in relation to corresponding EP application 15168753.0.

* cited by examiner

INTEGRATED THRUST REVERSER ACTUATION SYSTEM

BACKGROUND OF THE INVENTION

Contemporary turbofan aircraft engines may include a thrust reverser system to assist in reducing the aircraft speed during landing. Typical thrust reversers include a movable control surface that when in the reversing position directs airflow through a thrust reverser cascade that reverses at least a portion of the airflow passing through the engine. Typically, the moveable control surface is guided by a low friction rail sliding within a guide channel in response to multiple actuators controlled by a mechanical synchronizing system to prevent binding between the rail and guide due to non-symmetric loading.

BRIEF DESCRIPTION OF THE INVENTION

In one aspect, an embodiment of the invention relates to a turbofan engine having a turbine engine and a nacelle surrounding at least a portion of the turbine engine defining an annular bypass duct between the nacelle and the turbine engine and extending through the turbofan engine to define a generally forward-to-aft bypass air flow path. The turbofan engine further comprises a thrust reverser having a movable control surface and a thrust reverser actuation system. The movable control surface is movable to and from a reversing position where at least a portion of the bypass air flow is at least partially reversed. The thrust reverser actuation system comprises at least one actuator operably coupled to the movable control surface to move the movable control surface into and out of the reversing position. A guide comprising a rail and a bogie having at least one rotatable bearing surface coupled to the rail for relative translational movement between the rail and bogie connects the turbine engine to the movable control surface such that operation of the at least one actuator moves the movable control surface by translation movement between the rail and the bogie.

DESCRIPTION OF EMBODIMENTS OF THE INVENTION

Figure 1:
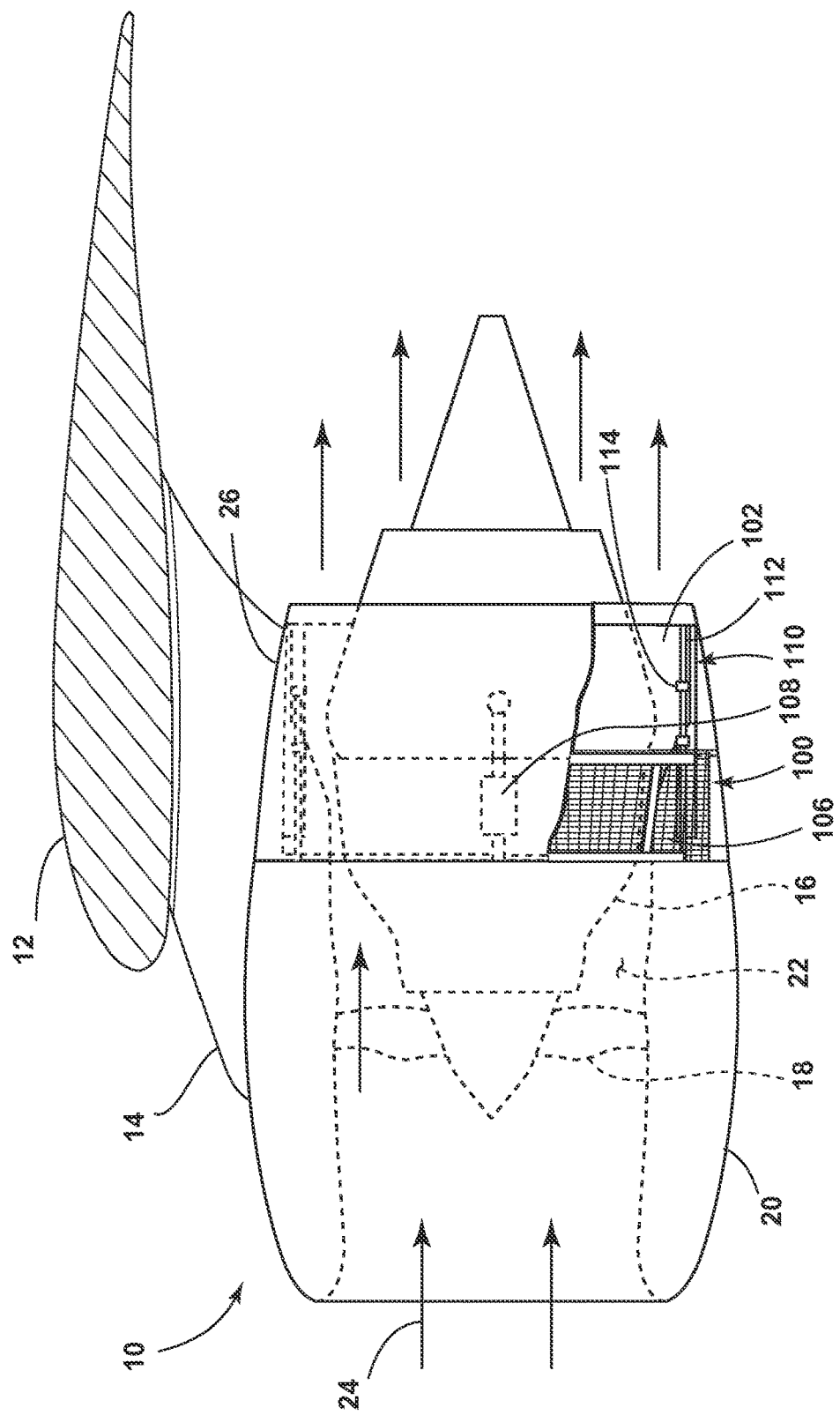
FIG. 1 is a schematic view of a wing, pylon and turbofan engine assembly.

FIG. 1 schematically illustrates a turbofan engine assembly 10 mounted to the wing 12 of an aircraft by an engine pylon 14. The turbofan engine assembly 10 comprises a turbine engine 16, a fan assembly 18, thrust reverser 100 and a nacelle 20. The nacelle 20 surrounds the turbine engine 16 and defines an annular airflow path or annular bypass duct 22 through the turbofan engine assembly 10 to define a generally forward-to-aft bypass airflow path as schematically illustrated by the arrow 24. The rear portion of the nacelle 20 comprises an outer cowling 26. A portion of the outer cowling 26 has been removed for clarity.

The thrust reverser 100 is disposed beneath the outer cowling 26. The thrust reverser 100 includes at least one movable control surface 102, which is movable between stowed and reversing positions, and a thrust reverser cascade 106. At least one actuator 108 and at least one guide 110 may be coupled to the movable control surface 102 to move and guide the movable control surface 102 between the stowed and reversing positions.

The guide 110 comprises a rail 112 and a bogie 114 coupled to the rail 112. One of the rail 112 and bogie 114 is mounted to the turbine engine 16 and the other of the rail 112 and bogie 114 is mounted to the movable control surface 102 such that operation of the at least one actuator 108 moves the movable control surface 102 by translational movement between the rail 112 and the bogie 114.

In the embodiment shown, the bogie 114 is coupled to the turbine engine 16 and the rail 112 is coupled to the moveable control surface 102. Although, an opposite mounting arrangement is contemplated. When in the stowed position as illustrated, at least a portion of the movable control surface 102 is disposed between the thrust reverser cascade 106 and the annular bypass duct 22 to block airflow in the annular bypass duct from the thrust reverser cascade 106.

Figure 2:
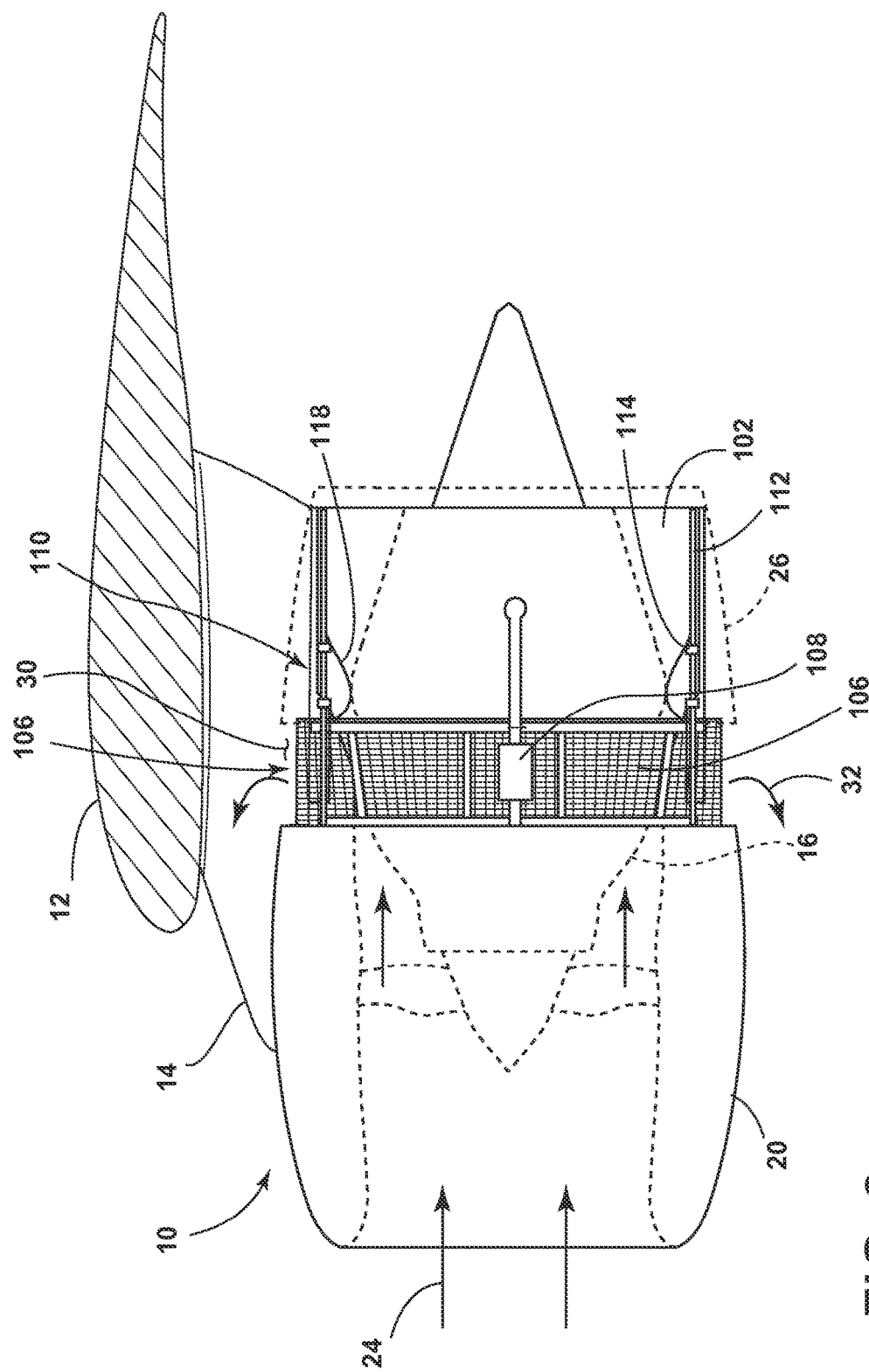
FIG. 2 is a schematic view of the wing, pylon and turbofan engine assembly of FIG. 1 with an exemplary thrust reverser in the reversing position.

FIG. 2 schematically illustrates turbofan engine assembly 10 with the thrust reverser 100 in the reversing position. The movable control surface 102 has been illustrated as a slidable portion of an inner cowling that is capable of axial motion with respect to the forward portion of the nacelle 20 wherein the outer cowling 26, shown in phantom may also be coupled to the movable control surface 102 such that axial motion of the movable control surface 102 corresponds to axial motion of the outer cowling 26. In the reversing position, the movable control surface 102 limits the annular bypass area between the movable control surface 102 and the turbine engine 16, it also opens up a portion 30 between the movable control surface 102 and the forward portion of the nacelle 20 exposing the thrust reverser cascade 106 to at least a portion of the bypass airflow. The thrust reverser 100 changes the direction of the thrust force by directing at least a portion of the bypass airflow through the thrust reverser cascade 106, which has a plurality of vanes the orients at least a portion of the flow with a rearward direction, resulting in a reversal of at least some of the air flow as illustrated by the arrows 32. An optional deflector 118 or flap may be included to aid in directing the airflow path between the movable control surface 102 and the forward portion of the nacelle 20.

Figure 3:
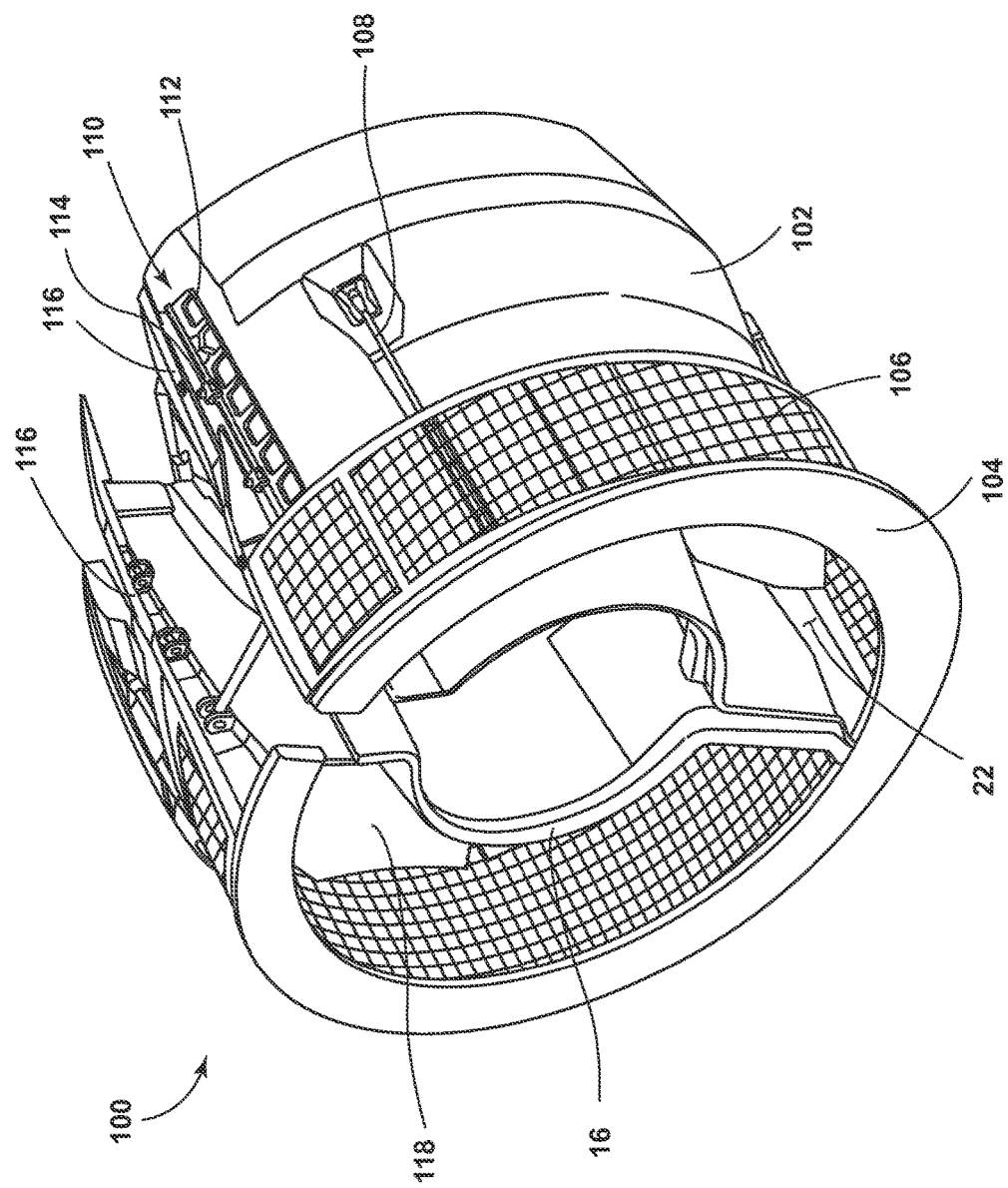
FIG. 3 is perspective view of a portion of turbofan engine assembly showing a thrust reverser.

FIG. 3 illustrates the thrust reverser 100 portion of the turbofan engine assembly 10 of FIGS. 1 and 2 with the outer cowling 26 of the nacelle 20 shown in FIGS. 1 and 2 removed for clarity. The thrust reverser 100 may further comprise a stationary support ring 104, engine mount 116 and an airflow deflector 118.

The engine mount 116 extends in the generally forward to aft direction and comprises a rigid elongated structure. The engine mount 116 may be coupled to one of the turbine engine 16, the engine pylon 14 or the nacelle 20 shown in FIGS. 1 and 2. It may also be integrally formed with an engine pylon 14 and form mounting locations for the turbine engine 16, integrally formed with the turbine engine 16 and form mounting locations for the engine pylon 14 or may be integrally formed with the nacelle 20 and form mounting locations for the turbine engine 16 and/or engine pylon 14.

The stationary support ring 104 is rigidly connected to the forward portion of the engine mount 116 and extends on either side of the engine mount 116 around a substantial portion of the circumference of the turbine engine 16 to provide rigid support about the circumference of the thrust reverser 100.

The movable control surface 102 and thrust reverser cascade 106 extend on either side of the engine mount 116 around a substantial portion of the circumference of the turbine engine 16 defining an annular bypass duct 22. The forward portion of the thrust reverser cascade 106 may be supported about its circumference by the stationary support ring 104. The deflector 118 may be attached to or integrally formed with the movable control surface 102 to selectively allow or prevent airflow through the annular bypass duct 22.

The actuator 108 extends in generally the forward to aft direction and may comprise two ends wherein a first stationary end may be attached to the stationary support ring 104 and the second extending end may be attached to the movable control surface 102.

The guide 110 is disposed between the movable control surface 102 and the engine mount 116 wherein the bogie 114 is fixed to the engine mount 116 and the rail 112 is fixed to the movable control surface 102.

The actuator 108 is operably coupled to the movable control surface 102 to move the movable control surface 102 into and out of the reversing position. When the movable control surface 102 is in the stowed position, the actuator 108 is retracted and the movable control surface 102 abuts the aft portion of the stationary support ring 104 blocking the inner circumferential surface of the thrust reverser cascade 106. Also when in the stowed position, the deflector 118 is configured such that bypass airflow may pass through the annular bypass duct 22 between the turbine engine 16 and the inner circumferential surface of the movable control surface 102.

Alternatively, the actuator 108 may include any apparatus capable moving the movable control surface 102 into and out of reversing position. For example, the actuator 108 may include but is not limited to, hydraulic actuators, pneumatic actuators, electric actuators, or rotation converters comprising gears, pulleys or the like.

When the movable control surface 102 is in the reversing position as illustrated, the actuator 108 is extended and the movable control surface 102 is spaced apart from the stationary support ring 104 exposing the inner circumferential surface of the thrust reverser cascade 106. Also when in the reversing position, the deflector 118 is configured such that bypass airflow may not pass through the annular bypass duct 22 between the turbine engine 16 and the inner circumferential surface of the movable control surface 102, forcing the airflow through the thrust reverser cascade 106 which reverses at least a portion of the bypass airflow.

When the movable control surface 102 is moved from one of the stowed or reversing position to the other of the stowed or reversing positions, the rail 112 fixed to the movable control surface 102 and the bogie 114 fixed to the engine mount 116 provide for translational movement of the moveable control surface 102 in the forward and aft direction.

Figure 4:
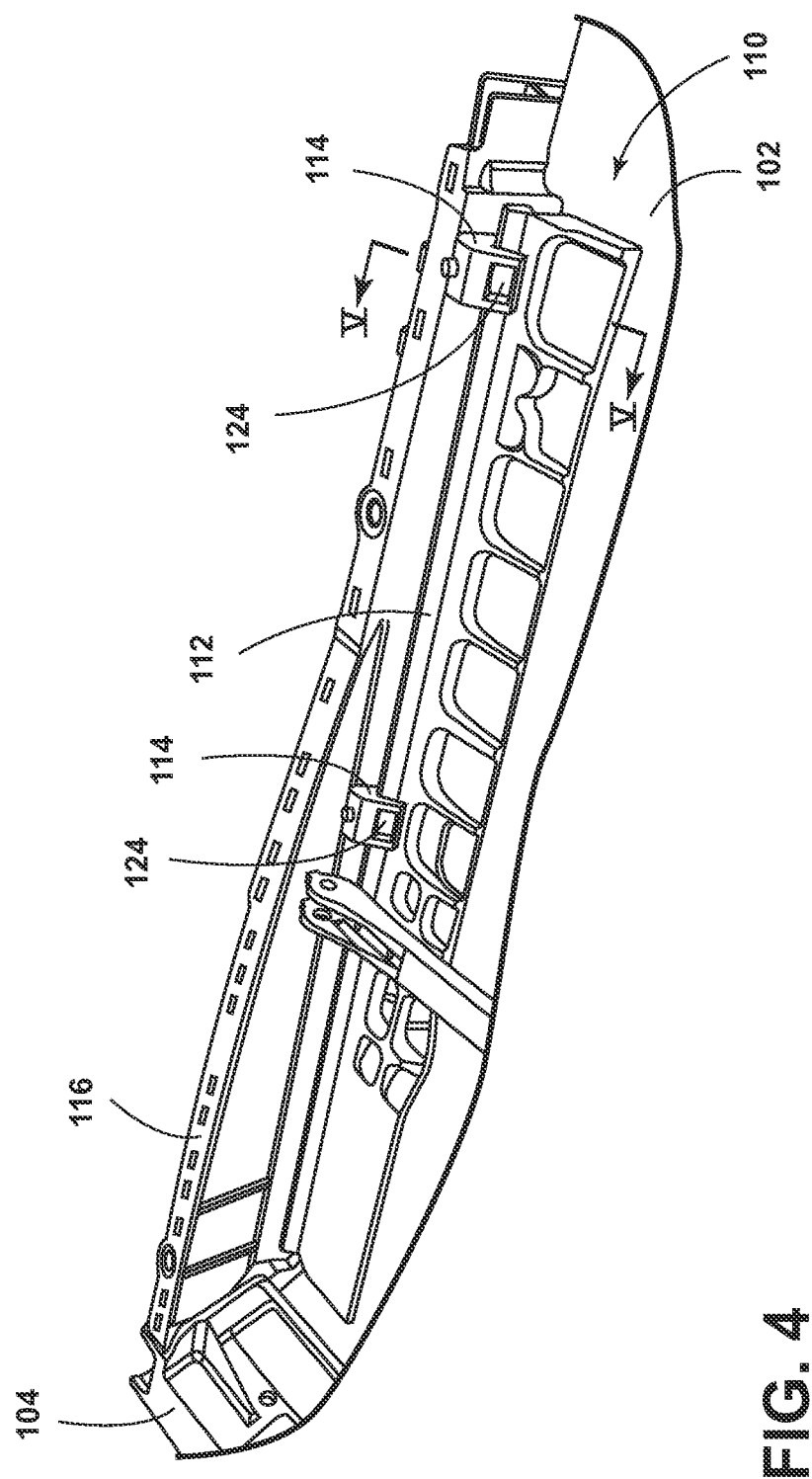
FIG. 4 is prospective view of a portion of the thrust reverser of FIG. 3.

FIG. 4 shows a close up view of a portion of FIG. 3 to better illustrate the guide 110 disposed between the movable control surface 102 and engine mount 116. The guide 110 may comprise two bogies 114 affixed to and spaced apart along the engine mount 116 so as to provide two points of contact to the rail 112 and prevent pivoting about a bogie 114 when the movable control surface is moved in the forward or aft directions. Each bogie 114 comprises a rotatable bearing surface 124 in communication with the rail 112. When the movable control surface 102 is moved in the forward or aft directions, the only points of contact between the rail 112 affixed to the moveable control surface 102 and the bogies 114 affixed to the engine mount 116 are the rotatable bearing surfaces 124 so as to provide for translational movement between the rail 112 and bogie 114, eliminating sliding friction and imparting only rolling friction between the rail 112 and bogie 114. While two bogies 114 are illustrated, more bogies 114 are contemplated. It is also possible for a single bogie 114 to be used as long as the relative racking or binding between the bogie 114 and rail 112 can be prevented, which may be possible for shorter travel distances and/or more bogie/rail combinations are provided about the engine.

Figure 5:
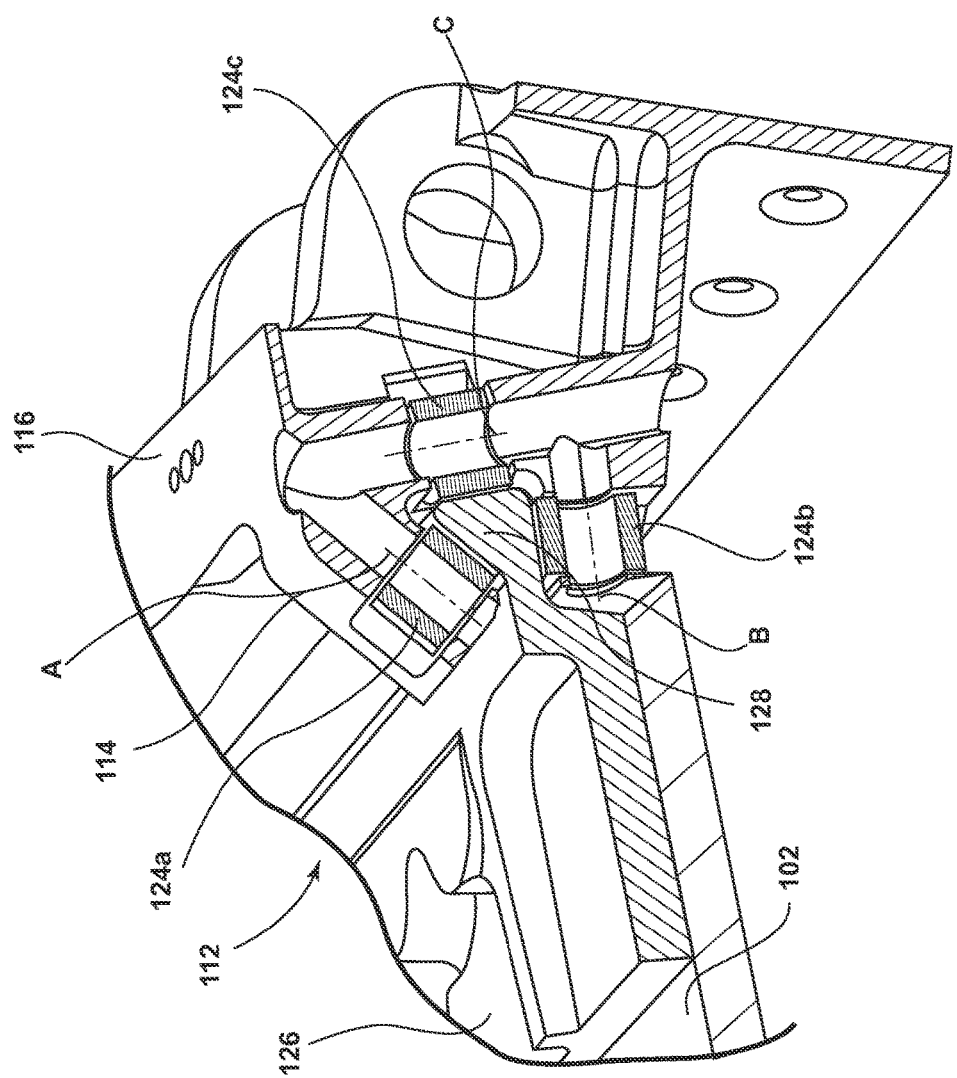
FIG. 5 is cross-sectional view taken along line V-V of FIG. 4.

FIG. 5 shows a cross sectional view taken along V-V of FIG. 4. The rail 112 may comprise a mounting portion 126 for mounting the rail 112 to the movable control surface 102 and a guiding portion 128 for coupling the bogie 114 to the rail 112. The guiding portion 128 of the rail 112 may extend in generally forward to aft direction as illustrated in FIG. 4 and may have a length configured to span the distance between the bogies 114 and allow for the translation movement of the moveable control surface 102 such that the guiding portion 128 does not lose contact with the either bogie 114 during said translational movement.

According to one embodiment, the guiding portion 128 may form three planar surfaces each lying on three distinct intersecting planes wherein all three distinct intersecting planes are perpendicular to a common cross section plane defined by the cross sectional line V-V illustrated in FIG. 4. The three planar surfaces of the guiding portion 128 are arranged to communicate with three rotatable bearing surfaces 124a, 124b, 124c housed in the bogie 114. The rotatable bearing surfaces 124a, 124b, 124c are shown without axles for clarity, however, it will be understood that any axle or the like well-known in the art may be used to enable the rotation the rotatable bearing surface 124a, 124b, 124c about rotation axes A, B, C respectively. The three rotatable bearing surface 124a, 124b, 124c are arranged to provide opposing bearing forces to the three planar surfaces of the guiding portion 128 such that the rotatable bearing surfaces 124a, 124b, 124c prevent separation of the rail 112 and bogie 114 while providing translational movement between the rail 112 and bogie 114.

When an actuator 108 imparts a force on the movable control surface 102 in either the forward or aft directions, the three planar surfaces of the guiding portion 128 contacting the outer surface of the rotatable bearing surfaces 124a, 124b, 124c induce rotation of the rotatable bearing surfaces 124a, 124b, 124c about rotation axes A, B, C, providing for translational movement between the actuating rail 112 and the stationary bogie 114 in the forward or aft directions. While three planar surfaces and three rotatable bearing surfaces 124a, 124b, 124c are illustrated, less or more rotatable bearing surfaces 124 are contemplated. It is also possible for a single rotatable bearing surface 124 to be used as long as the rotatable bearing surface 124 prevents separation between the rail 112 and bogie 114 and provides translation movement between the rail 112 and bogie 114, which may be possible with various rail 112, bogie 114 and rotatable bearing surface 124 configurations.

In another embodiment, the bogie 114 may be mounted the moveable control surface 102 and the rail 112 may be mounted to the engine mount 116 wherein the bogie 114 comprises at least one rotatable bearing surface coupled to the rail 112 for relative translational movement between the rail 112 and bogie 114.

The embodiments described above provide for a variety of benefits including that a the rail and bogie having at least one rotatable bearing surface provide for low friction translational movement between the engine mount and the moveable control surface such that binding, wear, number of actuators and actuation force may all be reduced.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbofan engine comprising:
   a turbine engine;
   a nacelle surrounding at least a portion of the turbine engine and defining an annular bypass duct between the nacelle and the turbine engine defining a forward-to-aft bypass air flow path;
   a thrust reverser having at least one movable control surface, movable to and from a reversing position, where at least a portion of a bypass air flow is at least partially reversed, wherein the at least one movable control surface is a slidable portion of an inner cowling of the nacelle capable of an axial motion with respect to a forward portion of the nacelle, and in the reversing position limits an annular bypass area between the at least one movable control surface and the turbine engine;
   a thrust reverser actuation system having at least one actuator operably coupled to the at least one movable control surface to move the at least one movable control surface into and out of the reversing position; and
   a guide comprising a rail having a guiding portion including three planar surfaces lying in three distinct, non-parallel, intersecting planes, wherein the three distinct, non-parallel, intersecting planes are distinct from one another and are perpendicular to a common cross section plane and wherein each plane of the three distinct, non-parallel, intersecting planes intersects the other two planes, and a bogie having three bearing surfaces coupled to the rail at the three planar surfaces for relative translational movement between the rail and the bogie;
   wherein one of the rail and the bogie is mounted to the turbine engine and other of the rail and the bogie is mounted to the at least one movable control surface such that an operation of the at least one actuator moves the at least one movable control surface by translation movement between the rail and the bogie; and
   wherein the three bearing surfaces each comprise a rotatable bearing surface, each rotatable bearing surface in contact with and arranged to provide opposing bearing forces to a corresponding one of the three planar surfaces to prevent separation of the rail and the bogie during translational movement between the rail and the bogie.

2. The turbofan engine of claim 1, wherein the nacelle comprises a cowling portion defining the at least one movable control surface.

3. The turbofan engine of claim 2, wherein the rail is provided on the cowling portion and the bogie is provided on an engine mount.

4. The turbofan engine of claim 3, wherein the bogie is fixedly mounted to the engine mount.

5. The turbofan engine of claim 4, further comprising an engine pylon forming the engine mount.

6. The turbofan engine of claim 1, further comprising an engine pylon and one of the rail and the bogie is mounted to the engine pylon and other of the rail and the bogie is mounted to the at least one movable control surface.

7. The turbofan engine of claim 6, wherein the bogie is fixedly mounted to the engine pylon.

8. The turbofan engine of claim 1, wherein in the reversing position, the at least one movable control surface exposes a thrust reverser cascade, between the at least one movable control surface and the forward portion of the nacelle, to at least the portion of the bypass air flow.

9. A thrust reverser comprising:
   at least one movable, control surface that includes a slidable portion of an inner cowling of a nacelle, movable to and from a reversing position with respect to a forward portion of the nacelle, wherein the nacelle surrounds at least a portion of a turbine engine and defines an annular bypass duct between the nacelle and the turbine engine defining a forward-to-aft bypass air flow path;
   a thrust reverser actuation system having at least one actuator operably coupled to the at least one movable control surface to move the at least one movable control surface into and out of the reversing position; and
   a guide that includes a rail having a guiding portion including three planar surfaces lying in three distinct, non-parallel, intersecting planes, wherein the three distinct, non-parallel, intersecting planes are distinct from one another and are perpendicular to a common cross section plane and wherein each plane of the three distinct, non-parallel, intersecting planes intersects the other two planes, and a bogie having three rotatable bearing surfaces coupled to the rail at the three planar surfaces for relative translational movement between the rail and the bogie;
   wherein one of the rail and the bogie is mounted to the turbine engine and the other of the rail and the bogie is mounted to the at least one movable control surface such that operation of the at least one actuator moves the at least one movable control surface by translation movement between the rail and the bogie, and in the reversing position, the at least one movable control surface limits an annular bypass area of the annular bypass duct formed between the at least one movable control surface and the turbine engine; and
   wherein the three bearing surfaces each comprise a rotatable bearing surface, each rotatable bearing surface in contact with and arranged to provide opposing bearing forces to a corresponding one of the three planar surfaces to prevent separation of the rail and the bogie during translational movement between the rail and the bogie.

10. The thrust reverser of claim 9, wherein in the reversing position, at least a portion of a bypass air flow is at least partially reversed.

11. The thrust reverser of claim 10, wherein in the reversing position, the at least one movable control surface exposes a thrust reverser cascade, between the at least one movable control surface and the forward portion of the nacelle, to at least the portion of the bypass airflow.

* * * * *